US012623617B1

(12) United States Patent
Azzi et al.

(10) Patent No.: US 12,623,617 B1
(45) Date of Patent: May 12, 2026

(54) AUTOMOTIVE APPLICATIONS OF WAVEGUIDE CONFINED SIGNAL AND POWER RADIO FREQUENCY CONNECTION SYSTEM

(71) Applicant: RTX Corporation, Farmington, CT (US)

(72) Inventors: Sharbel Elias Azzi, Palm Beach Gardens, FL (US); Joseph V. Mantese, Ellington, CT (US); Joseph Zacchio, Wethersfield, CT (US); Gurkan Gok, Milford, CT (US); William Richard Shaw, Westbrook, CT (US); Jonathan J. Gilson, West Hartford, CT (US); Andre M. Ajami, Henderson, NV (US); Coy B. Wood, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 323 days.

(21) Appl. No.: 18/183,729

(22) Filed: Mar. 14, 2023

(51) Int. Cl.
*B60R 16/023* (2006.01)
*G08C 17/02* (2006.01)

(52) U.S. Cl.
CPC .......... *B60R 16/0231* (2013.01); *G08C 17/02* (2013.01)

(58) Field of Classification Search
CPC .... B60R 16/023; B60R 16/0231; G08C 17/02
USPC .......................................................... 701/2
See application file for complete search history.

(56) References Cited

U.S. PATENT DOCUMENTS

| | | | | |
|---|---|---|---|---|
| 6,034,593 | A | * | 3/2000 | Chase ................. B60R 25/1003 340/426.36 |
| 7,551,070 | B2 | | 6/2009 | Talty et al. |
| 8,469,122 | B2 | * | 6/2013 | Perlman ............... B60L 53/124 342/372 |
| 9,153,861 | B2 | | 10/2015 | Laifenfeld et al. |
| 9,472,840 | B2 | * | 10/2016 | Herbsommer ........... H01P 3/16 |
| 9,871,558 | B2 | * | 1/2018 | Henry .............. H04B 10/25752 |
| 10,884,118 | B2 | * | 1/2021 | Hammerschmidt .. G01S 13/931 |
| 11,277,163 | B2 | | 3/2022 | Gilson et al. |
| 2002/0070851 | A1 | * | 6/2002 | Raichle .................... G08G 1/20 340/438 |
| 2006/0266564 | A1 | * | 11/2006 | Perlman ................. B60L 53/12 180/2.1 |
| 2007/0052520 | A1 | * | 3/2007 | Talty ..................... G01D 21/00 340/10.1 |

(Continued)

*Primary Examiner* — Manglesh M Patel
(74) *Attorney, Agent, or Firm* — CANTOR COLBURN LLP

(57) ABSTRACT
A vehicle, a communication system of the vehicle, and a method of operating the vehicle. The communication system includes a radio frequency waveguide for propagating a radio frequency signal through the vehicle, a first device, a first signal transducer associated with the first device, a second device and a second signal transducer associated with the second device. The first device senses a parameter of the vehicle and generates data. The first signal transducer generates a radio frequency signal indicative of the data into the waveguide. The second signal transducer receives the radio frequency signal from the waveguide and communicates the data to the second device. The second device controls an operation at the vehicle based on the data.

18 Claims, 3 Drawing Sheets

(56)                References Cited

U.S. PATENT DOCUMENTS

| | | | | |
|---|---|---|---|---|
| 2008/0045274 | A1* | 2/2008 | Witkowski | H04B 7/26 |
| | | | | 455/41.3 |
| 2009/0072957 | A1* | 3/2009 | Wu | G01S 13/584 |
| | | | | 340/435 |
| 2009/0099715 | A1* | 4/2009 | Cho | B61L 27/04 |
| | | | | 105/238.1 |
| 2009/0315751 | A1* | 12/2009 | Bennie | G07C 9/00309 |
| | | | | 340/425.5 |
| 2010/0044123 | A1* | 2/2010 | Perlman | H02J 50/90 |
| | | | | 180/2.1 |
| 2010/0148986 | A1* | 6/2010 | Aunkofer | B60C 23/0444 |
| | | | | 340/12.5 |
| 2010/0207754 | A1* | 8/2010 | Shostak | B60C 23/0433 |
| | | | | 340/572.1 |
| 2010/0224725 | A1* | 9/2010 | Perlman | B60L 53/14 |
| | | | | 244/1 R |
| 2011/0043423 | A1* | 2/2011 | Kirino | H01Q 3/06 |
| | | | | 343/882 |
| 2012/0269208 | A1* | 10/2012 | Grohlich | H04L 12/413 |
| | | | | 370/537 |
| 2014/0195108 | A1* | 7/2014 | Schumacher | G07C 5/008 |
| | | | | 701/1 |
| 2015/0048771 | A1* | 2/2015 | Caillaud | H02P 7/29 |
| | | | | 318/519 |
| 2015/0072681 | A1* | 3/2015 | Allmann | B60R 16/0231 |
| | | | | 455/435.1 |
| 2016/0064795 | A1* | 3/2016 | Chang | G02B 6/032 |
| | | | | 343/893 |
| 2016/0114686 | A1* | 4/2016 | Beattie, Jr. | B60L 53/305 |
| | | | | 320/108 |
| 2016/0240907 | A1* | 8/2016 | Haroun | G01S 13/931 |
| 2016/0294578 | A1* | 10/2016 | Maise | H04L 12/40013 |
| 2016/0325754 | A1* | 11/2016 | Stahulak | B60W 50/085 |
| 2017/0034278 | A1* | 2/2017 | Kulnick | H04W 4/90 |
| 2017/0149130 | A1* | 5/2017 | Kim | H01Q 21/0056 |
| 2017/0326977 | A1* | 11/2017 | Burt | B60K 17/3465 |
| 2018/0231635 | A1* | 8/2018 | Woehlte | H01Q 21/0006 |
| 2019/0061757 | A1* | 2/2019 | Garnault | B60W 30/143 |
| 2019/0111899 | A1* | 4/2019 | Lange, III | B60T 8/17 |
| 2020/0019165 | A1* | 1/2020 | Levandowski | G08G 1/09675 |
| 2020/0236522 | A1* | 7/2020 | Lofton | H04W 4/46 |
| 2020/0295430 | A1* | 9/2020 | Haroun | H01Q 1/3233 |
| 2020/0384963 | A1* | 12/2020 | Mellings | B60T 8/171 |
| 2020/0412811 | A1* | 12/2020 | Campbell | H04L 65/752 |
| 2021/0382135 | A1* | 12/2021 | Hess | G01S 7/028 |
| 2022/0232121 | A1* | 7/2022 | Lofton | H04W 4/48 |
| 2022/0289207 | A1* | 9/2022 | Kraeling | H04W 4/46 |
| 2022/0371559 | A1* | 11/2022 | Tione | B60T 8/171 |
| 2024/0149898 | A1* | 5/2024 | Barcia | B60N 2/002 |
| 2024/0153623 | A1* | 5/2024 | Barcia | G16H 40/63 |

* cited by examiner

AUTOMOTIVE APPLICATIONS OF WAVEGUIDE CONFINED SIGNAL AND POWER RADIO FREQUENCY CONNECTION SYSTEM

BACKGROUND

Exemplary embodiments pertain to the art of automobiles and, in particular, to a system and method for operating the vehicle using guided wireless communication.

Automobiles, trucks and other land vehicles include many electronic devices that are operated from a central computer or processor. The processor sends an electronic signal to the electronic device or receives an electronic signal from the electronic device, depending on whether the device is an actuator being controlled by the processor or a sensor that provides data to the processor. The electronic signal is currently sent over wires extending between the processor and the electronic devices. The number of electronic devices being integrated into land vehicles has grown over the years, resulting in the need for greater numbers of wires and thus adding undesirable weight to the vehicle. Accordingly, there is a need to provide electronic signals wirelessly through the vehicle in order to reduce wires and thus weight of the vehicle.

BRIEF DESCRIPTION

Disclosed is a method of operating a vehicle. The method includes measuring a parameter of the vehicle at a first device of the vehicle, generating a radio frequency signal at a first signal transducer associated with the first device, the radio frequency signal indicative of the parameter, propagating the radio frequency signal through a radio frequency waveguide to a second transducer, communicating the parameter from the second transducer to a second device in response to the radio frequency signal, and controlling an operation at the vehicle using the second device based on the parameter.

In addition to one or more of the features described herein, the method further includes communicating the parameter to the first signal transducer via a first control unit associated with the first device and communicating the parameter from the second transducer to a second control unit associated with the second device.

In addition to one or more of the features described herein, the method further includes converting between an analog signal and a digital signal using at least one of the first control unit and the second control unit.

In addition to one or more of the features described herein, the the radio frequency signal uses a CANBUS protocol.

In addition to one or more of the features described herein, the parameter is indicative of at least one of: (i) a braking system; (ii) a lighting system; (iii) an extra-vehicular communication system; (iv) a traction control system; (v) a ride system (vi) a handling system; (vii) a safety system; (viii) an entertainment system.

In addition to one or more of the features described herein, the first device is a processor and the second device is a motor and the method further includes controlling a speed of the motor using the radio frequency signal.

In addition to one or more of the features described herein, the method further includes propagating the radio frequency signal to transmit a power through the radio frequency waveguide and activating at least one of: (i) a node; and (ii) an actuator using the power.

Also disclosed is a communication system for a vehicle. The communication system includes a radio frequency waveguide for propagating a radio frequency signal through the vehicle, a first device configured to sense a parameter of the vehicle and generate data, a first signal transducer associated with the first device configured to generate the radio frequency signal into the waveguide, the radio frequency signal being indicative of the data, a second device configured to control an operation at the vehicle based on the data, and a second signal transducer associated with the second device configured to receive the radio frequency signal from the waveguide and provide the data to the second device.

In addition to one or more of the features described herein, the communication system further includes a first control unit for communicating between the first device and the first signal transducer and a second control unit for communicating between the second device and second signal transducer.

In addition to one or more of the features described herein, at least one of the first control unit and the second control unit is configured to convert between an analog signal and a digital signal.

In addition to one or more of the features described herein, the first device and the second device are configured to operate using a CANBUS protocol.

In addition to one or more of the features described herein, at least one of the first device and the second device is a component of at least one of: (i) a braking system; (ii) a lighting system; (iii) an extra-vehicular communication system; (iv) a traction control system; (v) a ride system (vi) a handling system; (vii) a safety system; (viii) an entertainment system.

In addition to one or more of the features described herein, the first device is a processor, the second device is a motor, and the processor is configured to control the motor via the radio frequency signal.

In addition to one or more of the features described herein, the second device is one of (i) a node; and (ii) an actuator is configured to be activated based on a power of the radio frequency signal.

Also disclosed is a vehicle. The vehicle includes a radio frequency waveguide for propagating a radio frequency signal through the vehicle, a first device configured to sense a parameter of the vehicle and generate data, a first signal transducer associated with the first device configured to generate the radio frequency signal into the waveguide based on the data, a second device configured to control an operation at the vehicle based on the data, and a second signal transducer associated with the second device configured to receive the radio frequency signal from the waveguide and provide the data to the second device.

In addition to one or more of the features described herein, the vehicle further includes a first control unit for communicating between the first device and the first signal transducer and a second control unit for communicating between the second device and second signal transducer.

In addition to one or more of the features described herein, at least one of the first control unit and the second control unit is configured to convert between an analog signal and a digital signal.

In addition to one or more of the features described herein, the first device and the second device are configured to operate using a CANBUS protocol.

In addition to one or more of the features described herein, at least one of the first device and the second device is a component of at least one of: (i) a braking system; (ii)

a lighting system; (iii) an extra-vehicular communication system; (iv) a traction control system; (v) a ride system (vi) a handling system; (vii) a safety system; (viii) an entertainment system.

In addition to one or more of the features described herein, the second device is one of (i) a node; and (ii) an actuator is configured to be activated based on a power level of the radio frequency signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
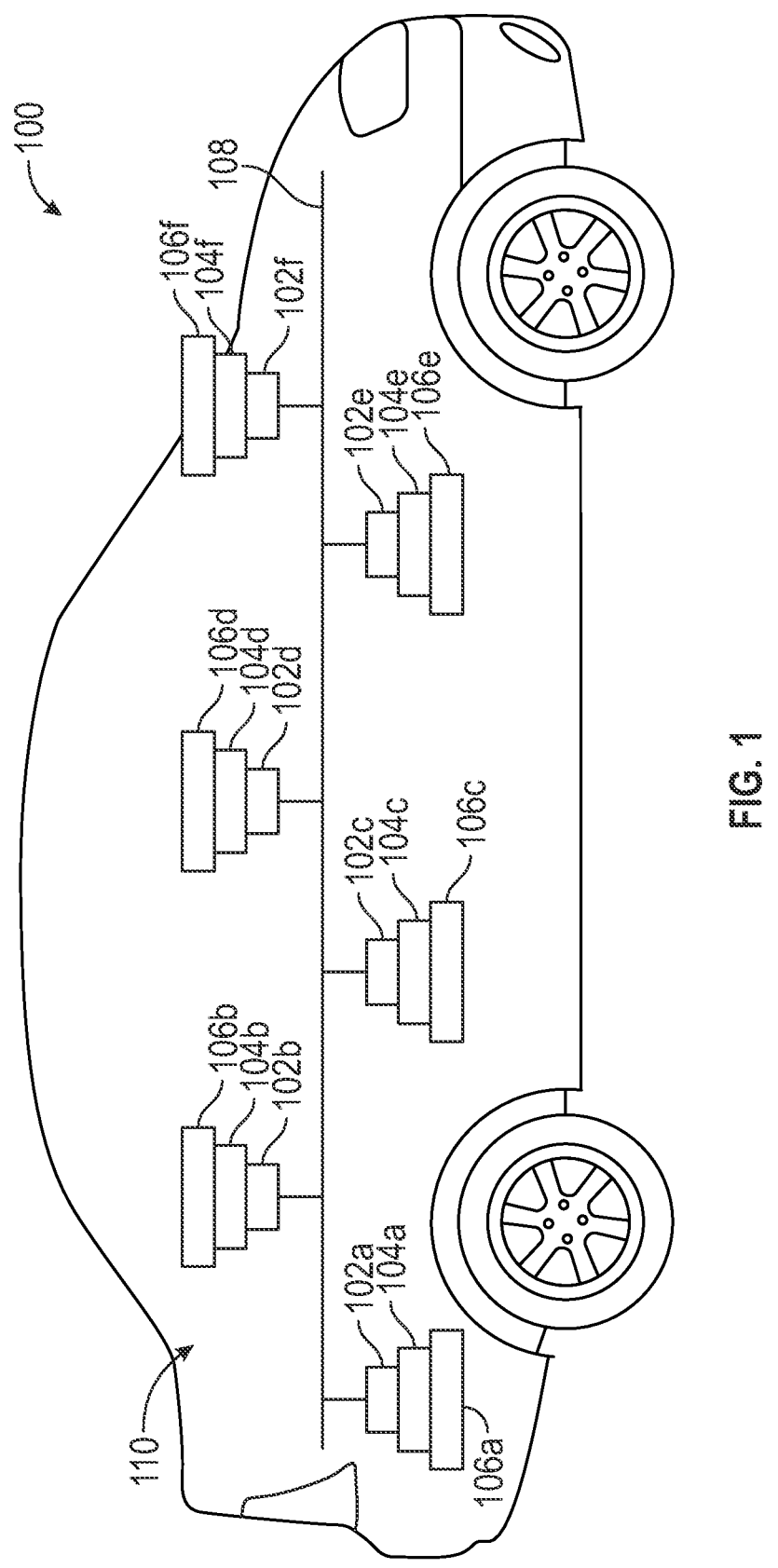
FIG. 1 shows a vehicle in an illustrative embodiment.

FIG. 1 shows a vehicle 100 in an illustrative embodiment. The vehicle can be an internal combustion engine vehicle, elective vehicle, hybrid vehicle, etc. The vehicle 100 includes a communication system 110 to control various operations of the vehicle. The communication system 110 includes a radio frequency waveguide 108 with a series of nodes 102a-102f at different locations along the radio frequency waveguide 108. Each node 102a-102f can communicate with another node by sending a digital signal over the radio frequency waveguide 108. The radio frequency waveguide 108 can be a hollow waveguide or can be a filled waveguide, such as a waveguide filled with dielectric material. An electronic signal can be transmitted through the radio frequency waveguide 108 within a Gigahertz (GHz) frequency range or a Terahertz (THz) frequency range, in various embodiments. In addition, an electromagnetic wave can be transmitted through the radio frequency waveguide 108 to transmit power from one end to another. In various embodiments, node can be a smart node or an actuator and the power sent through the waveguide can be used to activate the smart node or the actuator based on a power level of the signal. The radio frequency waveguide forms a Controller Area Network (CAN). Signals can be propagated through the radio frequency waveguide 108 using a CAN-BUS protocol.

Each node 102a-102f has a signal transducer that can act as a transmitter and/or a receiver. Each node 102a-102f is associated with a respective device 106a-106f and can be integrated with the respective device 106a-106f via an associated control unit 104a-f. Each control unit 104a-104f can control an operation of its associated device 106a-106f and, when necessary, can convert between analog signals and digital signals to integrate its device 106a-106f with the associated node 102a-102f. In various embodiments, each device 106a-106f can be a sensor of the vehicle 100 or an actuator of the vehicle 100. At least one device can be a central processor of the vehicle 100.

A node 102a-102f acting as sensor can sense a parameter of the platform and transmit a signal indicative of the parameter through the radio frequency waveguide 108 to the first device. A node acting as an actuator can perform an operation at the vehicle based on a signal received from the radio frequency waveguide 108.

A device 106a-106f can act as a sensor to sense a parameter of the vehicle 100 and transmit a signal (via its associated node 102a-102f) indicative of the parameter through the radio frequency waveguide 108. Exemplary parameters include, but at not limited to, a state of a component of the vehicle, a temperature, a level of a fluid of the vehicle, an air pressure, and electrical current, a voltage, a speed of the vehicle, etc. The parameter can be detected at a braking system, a lighting system, an extra-vehicular communication system, a traction control system, a ride system, a handling system, a safety system, an entertainment system, etc.

Alternatively, a device 106a-106f can act as an actuator to perform an operation at the vehicle 100 up receiving a signal from the radio frequency waveguide 108 via its associated node 102a-102f. Examples of actuator operations can include, but are not limited to, flipping a switch, turning a light on or off, operating an air conditioner system or heating system, opening and closing windows, locking and unlocking doors, controlling an operation of an entertainment system.

In an embodiment, a first device of the vehicle can measure a parameter of the vehicle. A first signal transducer associated with the first device can generate a radio frequency signal to propagate through the radio frequency waveguide. A second signal transducer receives the radio frequency signal and, in response, communicates the parameter to a second device. The second device can then control an operation at the vehicle based on the parameter. Each node 102a-102f or signal transducer can read the signal in the radio frequency waveguide 108, determine an applicability of the signal to the associated device and communicate the signal to the device when the signal is determined to be applicable. Otherwise, the node or signal transducer can allow the signal to pass through the waveguide to the next node. As an example, a first device can be a processor and the second device can be a motor and a signal can be transmitted from the processor through the radio frequency waveguide 108 to the motor to control a speed of the motor.

Figure 2:
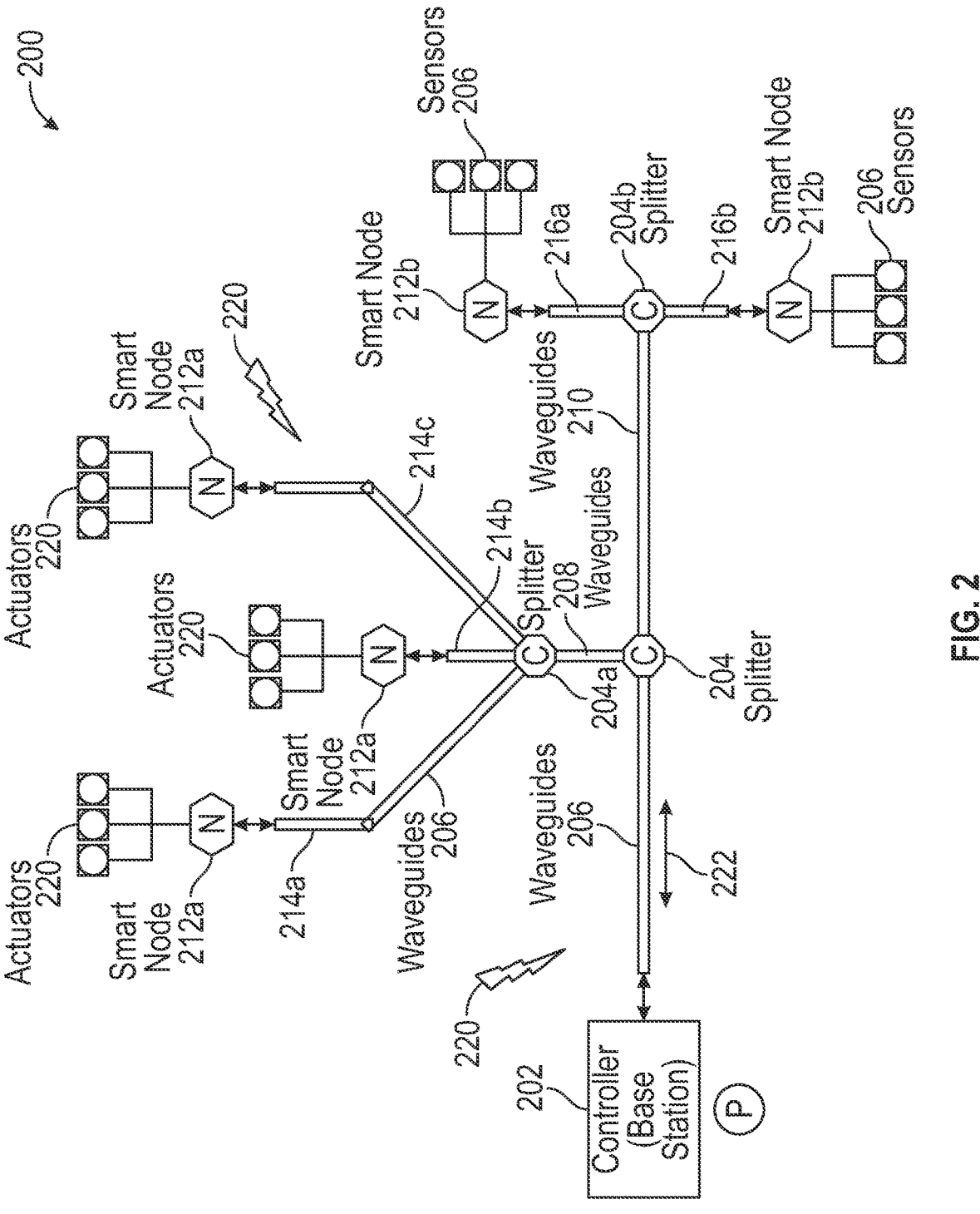
FIG. 2 depicts a guided electromagnetic transmission network as an example expansion of a communication system of the vehicle of FIG. 1.

Referring to FIG. 2, a guided electromagnetic transmission network 200 is depicted as an example expansion of the communication system 110 of the vehicle of FIG. 2. The guided electromagnetic transmission network 200 can include a controller 202 (such as an ECM) coupled to coupler 204 through waveguide 206. The coupler 204 is further coupled to coupler 204a through waveguide 208 and to coupler 204b through waveguide 210. Coupler 204a is further coupled to three nodes 212a through waveguides 214a, 214b, 214c in parallel. Each of the nodes 212a can interface or be combined with multiple actuators 220. Coupler 204b is also coupled to two nodes 212b through waveguides 216a, 216b in parallel. Each of the nodes 212b can interface or be combined with multiple sensors 222. Although the example of FIG. 2 depicts connections to actuators 220 and sensors 222 isolated to different branches, it will be understood that actuators 220 and sensors 222 can be interspersed with each other and need not be isolated on dedicated branches of the guided electromagnetic transmission network 200. Couplers 204, 204a, 204b can be splitters and/or can incorporate instances of a radio frequency-based repeater. Further, one or more instances of the radio frequency-based repeater can be installed at any of the waveguides 206, 208, 210, 214a-c, and/or 216a-b depending on the signal requirements of the guided electromagnetic transmission network 200.

Nodes 212a, 212b can be associated with various components of the vehicle 100 from which information and communication is performed for monitoring and/or control purposes. The nodes 212a, 212b may contain a single or multiple electronic circuits or sensors configured to communicate over the guided electromagnetic transmission network 200.

The controller 202 can send and receive power and data to and from the nodes 212a, 212b. The controller 202 may be located on equipment near other system components or located remotely as desired to meet application requirements.

A transmission path (TP) between the controller 202 and nodes 212a, 212b can be used to send and receive data routed through the controller 202 from a control module or other components. The TP may utilize electrical wire, optic fiber, waveguide or any other electromagnetic communication including radio frequency/microwave electromagnetic energy, visible or non-visible light. The interface between the controller 202 and nodes 212a, 212b can transmit power and signals.

The example nodes 212a, 212b may include radio-frequency identification devices along with processing, memory and/or the interfaces to connect to conventional sensors or actuators, such as solenoids or electro-hydraulic servo valves. The waveguides 206, 208, 210, 214a-c, and/or 216a-b can be shielded paths that support electromagnetic communication, including, for instance, radio frequency, microwaves, magnetic or optic waveguide transmission. Shielding can be provided such that electromagnetic energy or light or other intentional interference 230 with electromagnetic signals 232 (shown schematically as arrows) are mitigated in the guided electromagnetic transmission network 200. Moreover, the shielding provides that the electromagnetic signals 232 are less likely to propagate into the environment outside the guided electromagnetic transmission network 200 and provide unauthorized access to information. In some embodiments, guided electromagnetic radiation is in the range of 1-100 GHz as well as in the range of 1-10 THz. Electromagnetic radiation can be more tightly arranged around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 212a, 212b using various modulation and signaling techniques. In various embodiment, a first signal having a first frequency is used for communication with one node while a second signal having a second frequency is used for communication with another node. Splitters and repeaters of the guided electromagnetic transmission network 200 can be used to direct the signals based on their frequencies.

The nodes 212a with actuators 220 may include control devices, such as a solenoid, switch or other physical actuation devices. Radio frequency identification, electromagnetic or optical devices implemented as the nodes 212b with sensors 222 can provide information indicative of a physical parameter, such as pressure, temperature, speed, proximity, vibration, identification, and/or other parameters used for identifying, monitoring or controlling operation of the vehicle 100. Signals communicated in the guided electromagnetic transmission network 200 may employ techniques such as checksums, hash algorithms, error control algorithms and/or encryption to mitigate cyber security threats and interference.

In some embodiments, shielding in the guided electromagnetic transmission network 200 can be provided such that power and communication signals are shielded from outside interference, which may be caused by environmental electromagnetic or optic interference. Moreover, the shielding limits intentional interference 230 with communication at each component. Intentional interference 230 may take the form of unauthorized data capture, data insertion, general disruption and/or any other action that degrades system communication. Environmental sources of interference 230 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

The guided electromagnetic transmission network 200 provides for a reduction in cable and interconnecting systems to reduce cost and increases reliability by reducing the number of physical interconnections. Reductions in cable and connecting systems further provides for a reduction in weight while enabling additional redundancy. Moreover, additional sensors can be added without the need for additional wiring and physical connections to the controller 202, which may provide for increased system accuracy and response. Embodiments can provide a "plug-n-play" approach to add a new node, potentially without a requalification of the entire system but only the new component; thereby greatly reducing qualification burdens. Thus, a smart node at an end of a radio frequency waveguide can be removed and replaced with another smart node (a "replacement node"). The replacement node can be a same model as the smart node that is replaced or can be a different or upgraded model. The replacement node can perform a same function or a different function than that of the smart node that is replaced. The replacement node can send a synch signal to the controller upon replacement the smart node in order to notify the controller of the replacement, thereby allowing the controller to send signals that can be understood by the replacement node.

Figure 3:
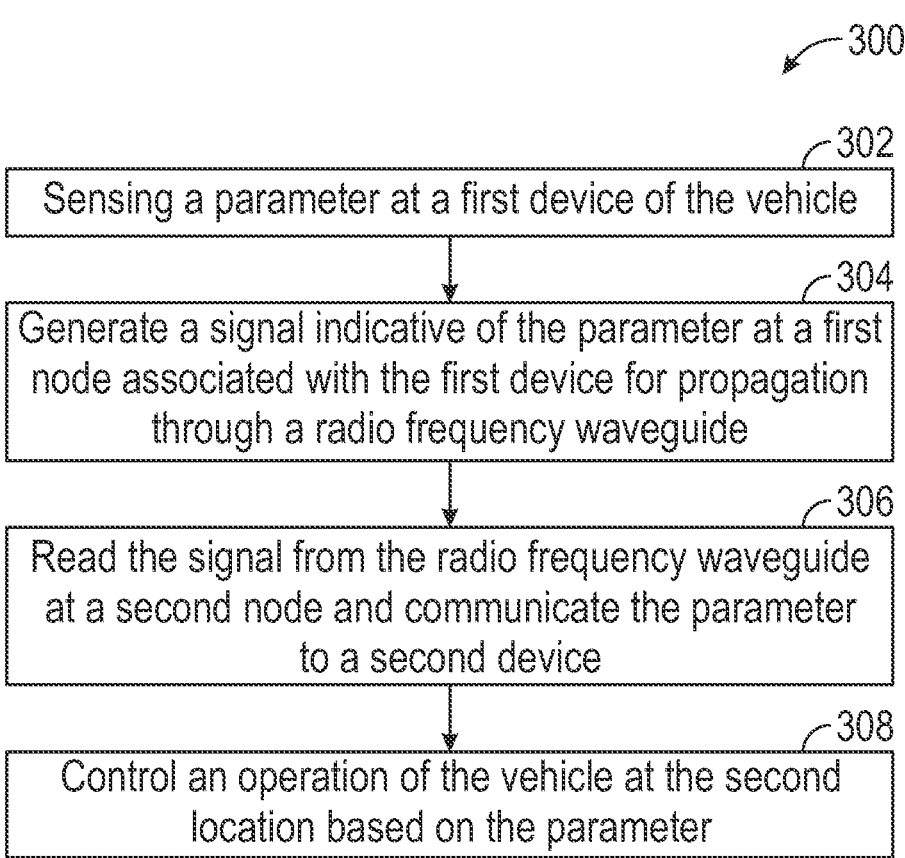
FIG. 3 shows a flowchart of a method for operating the vehicle using a radio frequency waveguide of the vehicle.

FIG. 3 shows a flowchart 300 of a method for operating the vehicle using the radio frequency waveguide of the vehicle. In box 302, a parameter is sensed at a first device of the vehicle. In box 304, a first node associated with the first device generates a radio frequency signal indicative of the parameter to propagate the signal through the radio frequency waveguide. In box 306, a second node along the radio frequency waveguide reads the radio frequency signal and communicates the parameter to a second device. In box 308, the second device controls an operation of the vehicle using the parameter.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a vehicle, comprising:
measuring a parameter of the vehicle at a first device of the vehicle;
generating a radio frequency signal at a first signal transducer associated with the first device, the radio frequency signal indicative of the parameter;
propagating a power signal and the radio frequency signal through a radio frequency waveguide to a second transducer, wherein the radio frequency waveguide is one of a hollow waveguide and a waveguide filled with dielectric material;
activating the second transducer based on a power level of the power signal;
communicating the parameter from the second transducer to a second device in response to the radio frequency signal; and
controlling an operation at the vehicle using the second device based on the parameter.

2. The method of claim 1, further comprising communicating the parameter to the first signal transducer via a first control unit associated with the first device and communicating the parameter from the second transducer to a second control unit associated with the second device.

3. The method of claim 2, further comprising converting between an analog signal and a digital signal using at least one of the first control unit and the second control unit.

4. The method of claim 2, wherein the radio frequency signal uses a CANBUS protocol.

5. The method of claim 4, wherein the parameter is indicative of at least one of: (i) a braking system; (ii) a lighting system; (iii) an extra-vehicular communication system; (iv) a traction control system; (v) a ride system (vi) a handling system; (vii) a safety system; (viii) an entertainment system.

6. The method of claim 1, wherein the first device is a processor and the second device is a motor, further comprising controlling a speed of the motor using the radio frequency signal.

7. A communication system for a vehicle, comprising:
a radio frequency waveguide for propagating a power signal and a radio frequency signal through the vehicle, wherein the radio frequency waveguide is one of a hollow waveguide and a waveguide filled with dielectric material;
a first device configured to sense a parameter of the vehicle and generate data;
a first signal transducer associated with the first device configured to generate the power signal and the radio frequency signal into the waveguide, the radio frequency signal being indicative of the data;
a second device configured to control an operation at the vehicle based on the data; and
a second signal transducer associated with the second device configured to be activated based on a power level of the power signal, receive the radio frequency signal from the waveguide and provide the data to the second device.

8. The communication system of claim 7, further comprising a first control unit for communicating between the first device and the first signal transducer and a second control unit for communicating between the second device and second signal transducer.

9. The communication system of claim 8, wherein at least one of the first control unit and the second control unit is configured to convert between an analog signal and a digital signal.

10. The communication system of claim 8, wherein the first device and the second device are configured to operate using a CANBUS protocol.

11. The communication system of claim 10, wherein at least one of the first device and the second device is a component of at least one of: (i) a braking system; (ii) a lighting system; (iii) an extra-vehicular communication system; (iv) a traction control system; (v) a ride system (vi) a handling system; (vii) a safety system; (viii) an entertainment system.

12. The communication system of claim 8, wherein the first device is a processor, the second device is a motor, and the processor is configured to control the motor via the radio frequency signal.

13. A vehicle, comprising:
a radio frequency waveguide for propagating a power signal and a radio frequency signal through the vehicle, wherein the radio frequency waveguide is one of a hollow waveguide and a waveguide filled with dielectric material;
a first device configured to sense a parameter of the vehicle and generate data;
a first signal transducer associated with the first device configured to generate the power signal and the radio frequency signal into the waveguide based on the data;
a second device configured to control an operation at the vehicle based on the data; and
a second signal transducer associated with the second device configured to be activated based on a power level of the power signal, receive the radio frequency signal from the waveguide and provide the data to the second device.

14. The vehicle of claim 13, further comprising a first control unit for communicating between the first device and the first signal transducer and a second control unit for communicating between the second device and second signal transducer.

15. The vehicle of claim 14, wherein at least one of the first control unit and the second control unit is configured to convert between an analog signal and a digital signal.

16. The vehicle of claim 14, wherein the first device and the second device are configured to operate using a CANBUS protocol.

17. The vehicle of claim 16, wherein at least one of the first device and the second device is a component of at least one of: (i) a braking system; (ii) a lighting system; (iii) an extra-vehicular communication system; (iv) a traction control system; (v) a ride system (vi) a handling system; (vii) a safety system; (viii) an entertainment system.

18. The vehicle of claim 13, wherein the second device is one of: (i) a node; and (ii) an actuator.

\* \* \* \* \*